United States Patent [19]

Mizoguchi et al.

[11] Patent Number: 5,567,151
[45] Date of Patent: Oct. 22, 1996

[54] REFLOW FURNACES WITH HOT AIR BLOW TYPE HEATERS

[75] Inventors: Naotake Mizoguchi; Tadao Takahashi, both of Tokyo, Japan

[73] Assignee: Senju Metal Industry Company Limited, Tokyo, Japan

[21] Appl. No.: 326,860

[22] Filed: Oct. 21, 1994

[51] Int. Cl.$^6$ .................................................. F27B 9/00
[52] U.S. Cl. .............................. 432/145; 432/8; 432/59; 432/144; 432/148
[58] Field of Search ............................. 432/8, 59, 143, 432/144, 145, 148, 152

[56] References Cited

U.S. PATENT DOCUMENTS

| | | | |
|---|---|---|---|
| 2,840,361 | 6/1958 | Hermans | 432/145 |
| 3,050,811 | 8/1962 | De Bartolomeis | 432/144 |
| 4,235,591 | 11/1980 | Aebli | 432/145 |
| 4,469,314 | 9/1984 | Takeuchi et al. | 432/144 |
| 4,715,810 | 12/1987 | Ramsey et al. | 432/8 |
| 5,154,338 | 10/1992 | Okuno et al. | 228/42 |

*Primary Examiner*—John T. Kwon
*Attorney, Agent, or Firm*—Nolte, Nolte and Hunter, P.C.

[57] ABSTRACT

This invention discloses a furnace in which hot gases are discharged from heaters to provide uniform heating to printed circuit boards commonly used in the electronic industry. Outside air is prevented from flowing into the furnace, so as to reduce and to stabilize the concentration of oxygen. The furnace 1 is designed with an air tunnel 2 to separate it into upper and lower sections which are fitted with hot air blow type heaters 5a, 5b. The hot air discharged from the heaters in the upper and lower sections flow in opposite directions to create a counter-flow of gases. Each individual heater can produce its own hot air circuit. They are designed with the blowing outlet and suction inlet in the same structure with the blowing outlet fitted with a redirectional flow plate 18 which directs the hot air to the suction inlet.

6 Claims, 3 Drawing Sheets

REFLOW FURNACES WITH HOT AIR BLOW TYPE HEATERS

OBJECTS OF THE INVENTION

This invention relates to reflow furnaces which are designed with an air tunnel separating upper and lower sections in which hot air blow type heaters are positioned. This type of furnace is used in the heating process for soldering printed circuit boards. During the heating process, solder cream is applied on the printed circuit board and fed through the tunnel of the furnace.

PRIOR ART

When soldering printed circuit boards with high grade solder cream; that is, solder having good solderability characteristics, very often some excess cream will remain on the board. This residual flux wets gaps between "land" areas and reduces the insulated resistance; or forms corrosive substance in the "land" areas which causes malfunction in the electronic devices. These high grade solder creams include solids formed of resin, activated substances and thixotropes in substantial amount. These solid particles are the cause of the above problem when they form residue on the printed circuit board after soldering during the heating process.

The demand for better performance and higher reliability of electronic parts such as computer chips and telecommunication devices requires almost all printed circuit boards to be free from such problems. When applying such high grade solder cream, it must be assured that all the residue formed on printed circuit boards is properly washed away after the soldering process. Freon and trichloroethelene are two good solvents used to wash away the residuals effectively, but they are not environmentally safe as they adversely affect the ozone layer in the outer atmosphere. The depletion of the ozone layer permits harmful ultraviolet rays to reach the earth's surface, causing disease such as skin cancer. The uses of these solvents, therefore, should be slowly and gradually phased out.

Solder cream with a lesser content of solid particles has been discovered recently to overcome the problem. The residue of this solder cream does not have to be washed off after soldering and is known as "no clean" solder cream.

However, due to the lesser content of solid particles, such solder cream makes bonding less effective. Also, very often the non-soldered portion of the printed circuit board will have an excessive number of spherical solder balls when excessive oxygen introduces itself into the air tunnel, further inhibiting good quality bonding.

The heating process for soldering is usually done by a furnace which is divided into a preheating and a heating zone. Printed circuit boards with solder cream applied on them are fed through the air tunnel and preheated to approximately the bonding temperature in the preheating zone, and further heat is applied to melt the powder form of the solder cream evenly in the heating zone. If too much oxygen is supplied in the preheating zone, copper coating will form in the "land" surfaces or the solder powder will oxidize on the surfaces. However, when those solder creams with a greater composition of solid particle are used, the resin or activated substances in it will eliminate the formation of copper coating or the oxidation of solder powder and thus will provide high quality bonding. The solid particles in such soldering creams are also effective to reduce the surface tension of the molten solder and allow it to flow smoothly from outside the "land" area into the "land" area without any formation of tiny spherical balls.

Due to the lesser contents of solid particles in the "no clean" solder cream, the formation of copper coating or the oxidation of solder powder remains a problem. The molten solder also cannot flow smoothly into the "land" area due to the greater surface tension. The deficiency of flow will cause the formation of residuals in the form of tiny spherical balls.

However, if the "no clean" solder cream is used in the absence of oxygen, no oxidation will occur and hence the above-noted deficiency can be eliminated. Presently, the "no clean" solder cream is used in the furnace which is filled with nitrogen gas to create an oxygen free condition. Hereafter, this type of furnace will just be mentioned as the furnace.

Bonding deficiency can normally be reduced by reducing the concentration level of oxygen in the furnace, the concentration level should be generally below 1000 ppm (part per million) and better if it is below 300 ppm.

Filling the furnace with nitrogen, however, makes heating the printed circuit board, evenly, difficult. To overcome this, electric fans or blowers are fitted in the furnace so that they can blow the hot nitrogen gas to the surface of the printed circuit board, hence heating it evenly.

The inventor of this fan-fitted nitrogen furnace has applied through the Japanese Patent Office, for the registration of this furnace, application No. 2-194385 and filed a corresponding application for United States Letters Patent, application Ser. No. 710,484, now U.S. Pat. No. 5,154,338. The main feature of this furnace is the installation of blowers to achieve even heating. In this invention, hot air blow type heaters are fitted in the upper and lower sections of the air tunnel (sometimes hereinafter referred to as a gas tunnel to include both air and added nitrogen inasmuch as the nitrogen in the air is increased and the oxygen decreased in the furnace). The upper hot air blow type heaters will discharge hot gas from the blowing outlets and this hot gas will be received by the suction inlet of the lower hot air blow type heaters and vice-versa. This will form the upper-to-lower and lower-to-upper gas circulation, but hot gas from the outlets of the upper and lower blowers will oppose each other to form a counter-flow of opposing streams of gas.

With this arrangement, part of the hot air will circulate between the upper and lower hot air blow type heaters. At the same time, the other part of the hot gas will counter each other in the counter-flow of opposing streams of gas. With such an arrangement, the heated gas is substantially evenly discharged to the surfaces of the printed circuit boards and provides uniform heating on the circuit boards.

However, while under stationery condition of the printed circuit boards in the furnace (i.e., conveyor belt in the gas tunnel is not moving) with 150 liters per minute of nitrogen being supplied to the circuit board, the concentration level of oxygen is substantially stabilized at less than 300 ppm; under the condition where the printed circuit is moving through the tunnel, the concentration level of oxygen will increase and fluctuate above 300 ppm, causing unstable concentration levels.

This invention is to provide a way to maintain the stabilized condition of the oxygen concentration level while the printed circuit board is moving in the preheating and heating sections of the tunnel through the furnace. The invention makes use of the characteristics of the hot air blow type heaters to maintain a low oxygen concentration level in the furnace.

DESCRIPTION OF THE INVENTION

The inventors have further researched and studied the factors that cause the instability of the oxygen concentration level in the furnace. They found that while the printed circuit board is moving along the tunnel between the upper and lower hot air blow type heaters (hereinafter "heaters"), it has blocked the path of the upper-to-lower and lower-to-upper circulation and causing the hot gases to flow swiftly along the surface of the printed circuit board in the direction from the outlet to the inlet of the heaters. The swift motion of hot gas that formed in the furnace produces negative pressure which is lower than the outside pressure. This pressure will induce the outside air to enter the furnace and hence increase the oxygen concentration level.

The main idea of the present invention is by considering the above factor, finding a method and apparatus to prevent the flow of the hot gases along the moving printed circuit board to eliminate the formation of negative pressure in the furnace. The problem of outside air entering the furnace is then solved.

This invention is concerned with a type of furnace separated by a gas tunnel and fitted with hot air blow type heaters above and below the tunnel. The feature of the heater of the invention is that both the blowing outlet and suction inlet are formed on the same structure. This will enable the hot gas discharged from the outlet to return to the inlet on the same heater. Simultaneously, the heaters are fitted in the furnace in such a way that the direction of flow of hot gases from the upper heaters above the tunnel is opposite to the direction of flow of hot gases from the lower heaters; i.e., the flow directions of hot gases from upper and lower heaters will for a counter flow along the tunnel.

In this invention, the heater is designed with a blowing outlet and suction inlet on the same structure. Within the blowing outlet and suction inlet flow path a blower and electric heating coils are fitted, a redirectional flow plate is also fitted to the structure adjacent the blowing outlet so that the flow can be directed to the suction inlet of the same heater.

The mouth of the blowing outlet is formed by boring numerous holes or openings on the outlet plate which blows hot gas at a right angle to the direction of the moving path of the printed circuit boards. Adjacent the outlet, near the holes and openings, a redirectional flow plate is fitted slanted to guide and direct the hot gas to return to the suction inlet.

The outlet plate of the blowing outlet may be made from multiporous metal plate (commercial name: Ceramet) with pre-bored holes. It is also possible to fabricate the outlet plate from metal plates by boring holes or openings in it. In installations where two or more outlet plates are used they can be made from either of both types of metal plates. Ceramic covering is used to cover the surfaces of these plates in order to radiate uniform infrared ray for the even heating of the printed circuit board.

Function

With hot air blow type heaters fitted in both the upper and lower portion of the furnace and each individual heater producing its own air circulation path, no hot gas was carried away by the printed circuit board to outer region, no outer air is drawn into the furnace, hence the printed circuit board can be heated evenly.

DETAILED DESCRIPTION OF THE INVENTION

Figure 1:
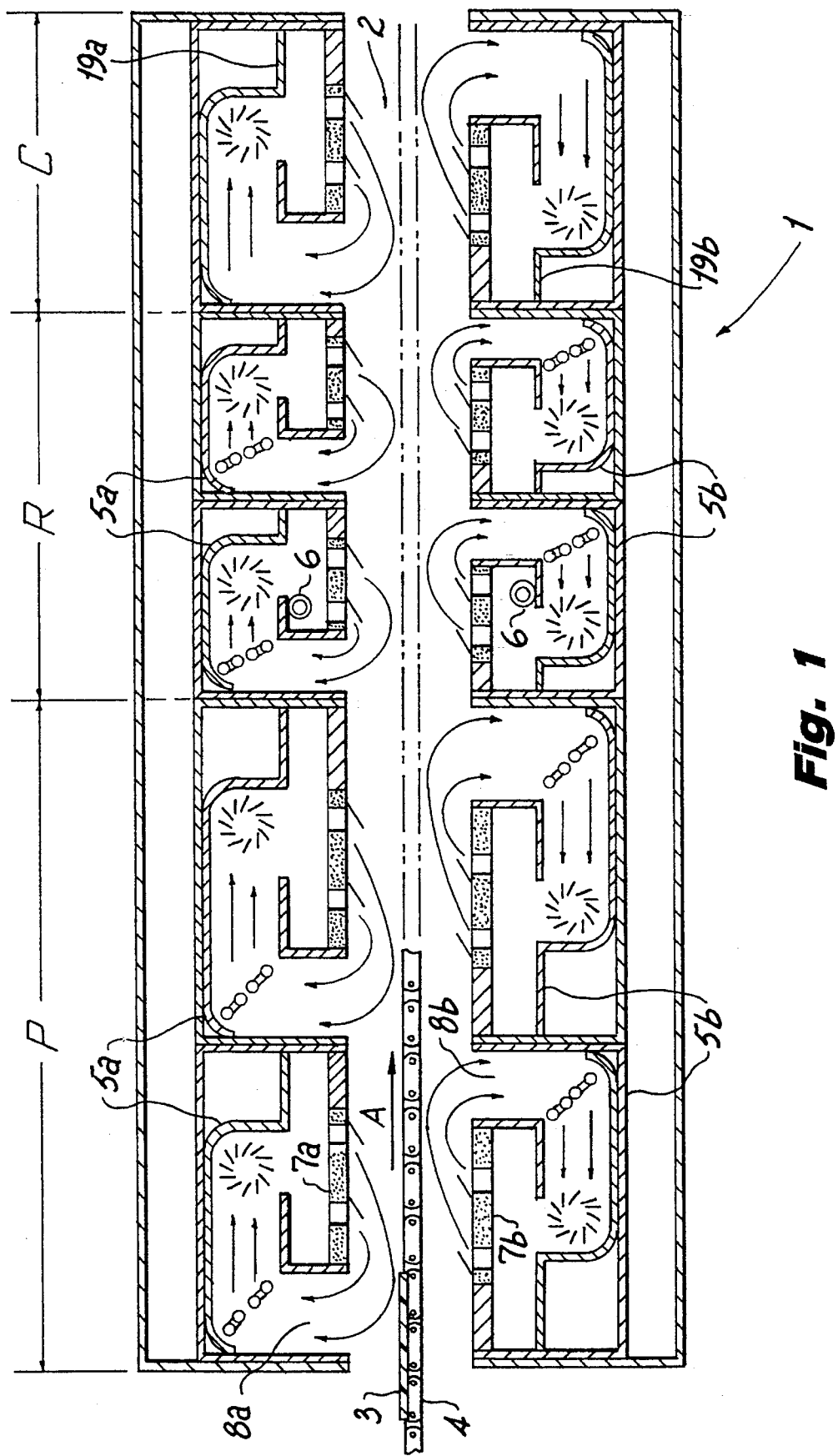
FIG. 1 is a diagrammatic longitudinal section taken along the longitudinal center line of a furnace incorporating the inventive heaters.

In the middle of the furnace 1, an air tunnel 2 is formed. Through this tunnel 2, printed circuit board 3 is conveyed by a conveyor belt 4 moving in direction A (as shown by the arrow in FIG. 2). The air tunnel 2 is divided into three regions; i.e., from the entry end, the preheating region P, the heating region R and the cooling region C, respectively. Hot air blow type heaters 5a and 5b are fitted in the upper and lower sections of the preheating region P and the heating region R.

The design of the heaters in the preheating region have the following characteristics; i.e., the blowing outlet and suction inlet are formed on the same surface of the heater structure in such a way that hot air discharged from the blowing outlet is guided and directed to the suction inlet of the same heater.

Figure 2:
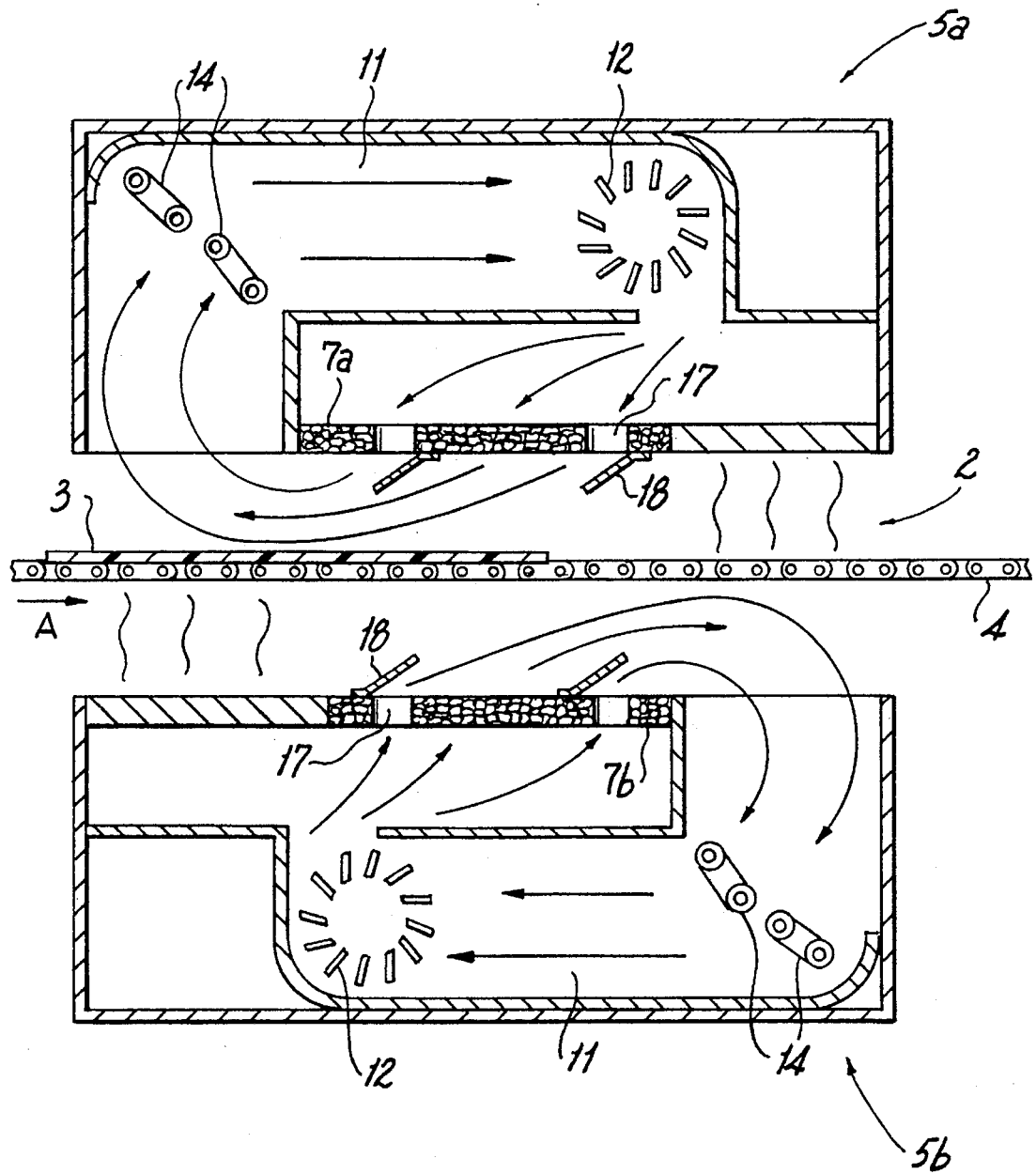
FIG. 2 is an enlarged view of the front or entry end of the furnace of FIG. 1.

The hot air discharged from heater 5a in the upper section of the tunnel will flow to the left of the furnace as shown in FIGS. 1 and 2; i.e., toward the entry end. The hot air discharged from the heater 5b in the lower section of the tunnel will flow to the right of the furnace; i.e., to the discharge end of the furnace. This is the characteristic of the counter-flow furnace of the invention.

The heaters 5a and 5b that are fitted in the heating region R, are the same as those in the preheating section just described. In addition, nitrogen supply nozzles 6 are fitted and connected to a nitrogen supplying source, such as nitrogen cylinder or nitrogen generating device (PSA) not shown.

Figure 3:
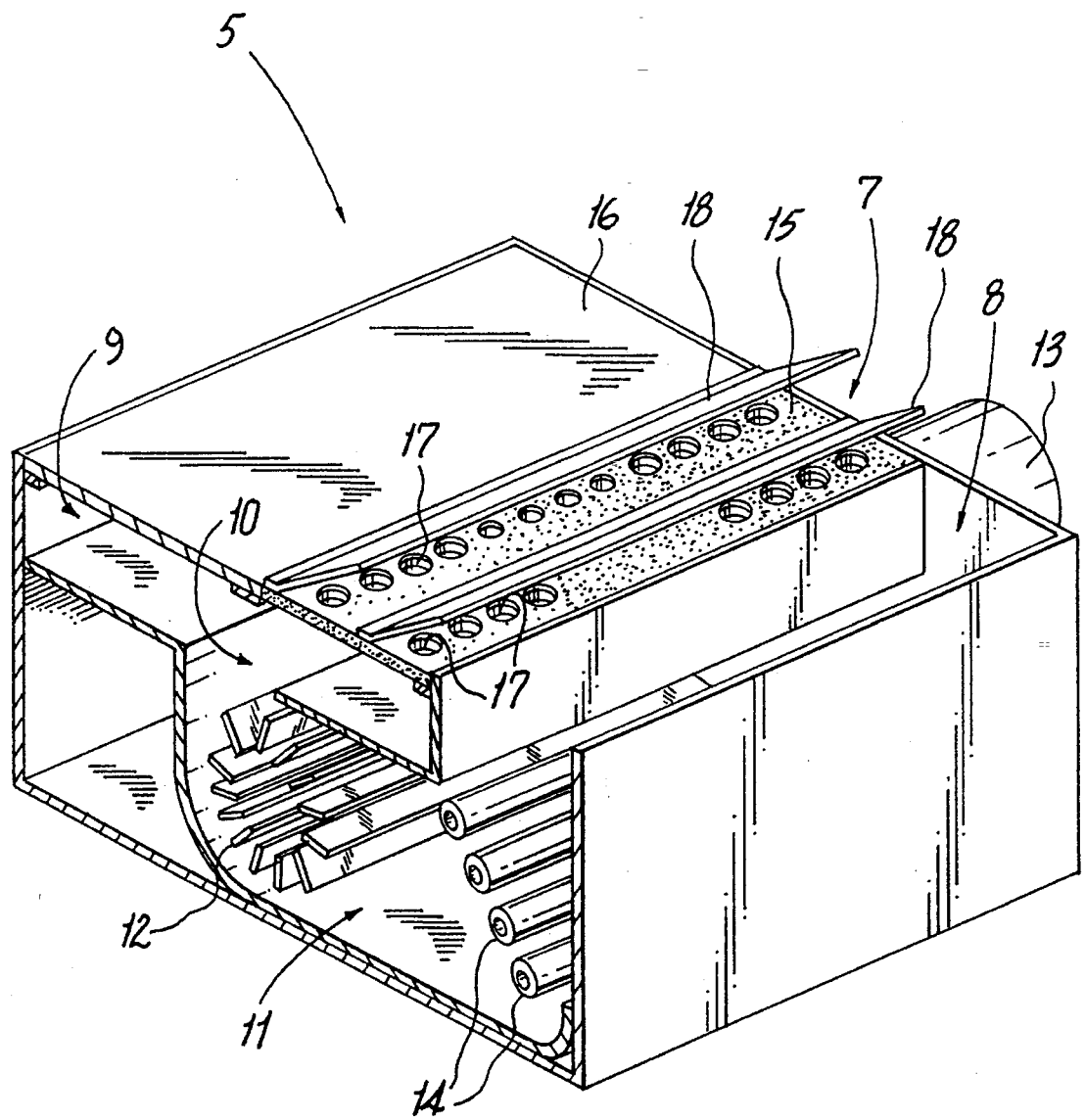
FIG. 3 is a diagrammatic isometric view of one of the hot air blow type heaters of FIG. 1.

Referring to FIG. 3, the detail description on the hot-air blow type heater is as follows:

The hot air blow type heater 5 with the blowing outlet 7 and the suction inlet 8 are formed on the same surface structure. The mouth of the blowing outlet 7 is formed of a rectangular box shaped space 9. A flow entrance 10 is formed in the middle of the bottom of the box shaped space. The flow entrance 10 and the suction inlet 8 are connected by a flow path 11. A blower 12 which is driven by a motor 13 outside the heater is fitted in the path 11 near to the flow entrance 10. This blower should be able to draw the fluid evenly from the path 11 to a fan in the junction of the flow entrance 10.

Electric heating coils 14 are fitted in the path 11 near to the suction inlet 8. The exact position of the electric coils is arbitrary, but hot air should allow to flow across them.

As shown in FIG. 3, the structure of the blowing outlet 7 that is adjacent the suction inlet 8 comprises a cover made from a multiporous (indicated by the dots in FIG. 3 and the diagrammatic interstices in FIG. 2) metal plate 15 and the other structure further from the suction inlet 8 is a cover made from metal plate stock 16. The exposed surface (facing the tunnel) is preferably covered with ceramic. Two rows of outlet openings with numerous holes 17 are bored on the multiporous metal plate 15 and the direction of blow is at right angles to the moving path of the printed circuit board.

The holes that are bored in the plate are, for the first row, larger holes at the ends and gradually smaller holes in the middle; for the second row, larger holes are bored at the ends and no holes are bored in the middle. The design of holes formation in such condition is to provide more hot gas to the transport grippers (not shown) which hold the printed circuit board to the conveyor and to increase the temperature at the ends of the printed circuit board where there is a cooling effect due to the grippers and, hence, provide uniform temperature throughout the printed circuit board.

Directional flow plates 18 are fitted to the external surface of the outlet structure 17, slanted at an angle and facing the suction inlet to direct the hot gas to return to the heater.

If a multiporous metal plate with numerous holes or openings bored in it is used as the structure of the blowing outlet next to the suction inlet then hot gas is able to discharge from the pores weakly and discharge from the bored holes strongly. This design will provide the printed circuit board with even heating and simultaneously allow the hot air to return to the suction inlet easily. Alternatively, the structure plate of the blowing outlet next to the suction inlet can also be made from the multiporous metal plate with holes bored in it or from metal plate stock with holes bored into it.

Coolers 19a and 19b are fitted on the upper and lower section of the cooling region C. The structure of the coolers is similar to the heaters except that no heating coils are fitted in them. Similarly, the cooler may be made to form its own nitrogen circulation. Hence the nitrogen is limited to flow in a specific region without inducing outside air to enter the furnace.

The following is the brief description of the heating condition of the printed circuit board in the furnace.

The heaters and blowers in the preheating and heating region are switched on to start the heating process. Simultaneously nitrogen is supplied to the supply nozzles. When the furnace temperature and the oxygen concentration level have reached the required values, the printed circuit boards are fed via the conveyor belt 4 through the furnace in the direction of arrow A as indicated in FIG. 2.

Hot air and nitrogen gases discharge from the upper heaters 5a through the blowing outlets 7a and flow in the slanting downward direction to the upper surfaces of the printed circuit boards, heating them before returning to the heater through the suction inlets 8a. Similarly, hot air and nitrogen gases discharge from the lower heater 5b through the blowing outlets 7b and flow in the slanting upward direction to the lower surfaces of the printed circuit boards, heating them before returning to the heater through the suction inlets 8b.

The heating of hot air in the blowing outlet is obtained from the heating coils. The ceramic surfaces of the blowing outlets also radiate infrared radiation and multiplies the heating effect to provide the necessary heat evenly to the printed circuit board.

The flow directions of hot air in the furnace from both the upper and lower heaters form a counter flow along the air tunnel. The hot air at the entrance and exit of the tunnel flows in a circular manner and adverse pressure is prevented to form inside the tunnel, this will stop outside air from entering the furnace and hence maintain the stability of the oxygen concentration level.

When the nitrogen supply through the supply nozzle has reached 150 liter per minute, and printed circuit boards with dimension of 300 mm×250 mm are fed through the furnace with an alternate spacing, the oxygen concentration level measured anywhere in the furnace is below 100 ppm. If printed circuit boards are fed through a furnace which is not design in this way, but under the same condition, the hot air discharged will not return to the same heater, then the measured oxygen concentration level fluctuates tremendously between 300 to 1000 ppm.

The Effect of the Invention

From the description above, this furnace with heaters fitted to the lower and upper section of the air tunnel, is able to provide each heater with its own air circulation without the influence of the movement of the printed circuit board thus avoiding the formation of adverse pressure in the air tunnel. The hot gases discharged from the upper and lower heaters also form a counter flow along the printed circuit board, this will avoid unidirectional flow in the tunnel and prevent outside air from entering the furnace thus providing an excellent means of reducing the oxygen concentration level. Also, with the unique fixture of the directional flow plate on the blowing outlet to effect the hot air return to the same heater and confine the flow of gas to a specific region, there is very little outside air entering the furnace. Therefore, the hot gases will keep recirculating within each heater to maintain a steady temperature. The arrangement is economical as well because the furnace uses less electricity as the temperature does not fluctuate.

We claim:

1. A reflow furnace for soldering electrical components comprising an upper portion and a lower portion, said upper and lower portions being vertically spaced apart above and below a gas tunnel, said gas tunnel extending along a horizontal axis between an entry end and an exit end, a conveyor for moving electrical components from said entry end to said exit end and at least one hot air blower heater in said upper portion and at least one hot air blower heater in said lower portion;

each said heater comprising means including a gas outlet for blowing out hot gas into said tunnel and means including a gas inlet for suctioning back into said heater the hot gas blown out by said blowing means into said tunnel and means at said gas outlet for directing the hot gas blown out into said tunnel a) toward said axis, b) toward one of said entry end and said exit end to impinge upon electrical components moving on said conveyor and c) in a direction toward said suctioning means;

said directing means in said heater in said upper portion comprising means for directing gas toward one said end above said axis and to said suctioning means in said heater in said upper portion and said directing means in said heater in said lower portion comprising means for directing gas toward the other of said ends below said axis and to said suctioning means in said heater in said lower portion;

said heaters in said furnace thereby comprising means for substantially stabilizing the gas pressure in said tunnel by inhibiting the hot gas blown out into said tunnel from leaving said tunnel with moving electrical components and by inhibiting ambient air outside said tunnel from being drawn into said tunnel.

2. The furnace of claim 1 wherein each said heater comprises a structure and said blowing means and suctioning means are located adjacent one another on said structure, said structure further comprising a gas flow path communicating between a blowing outlet and a gas flow entrance, said gas blowing means including a blower located adjacent said blowing outlet and a directional plate is secured adjacent said blowing outlet and comprises said means for directing the hot gas blown out by said blowing means.

3. The furnace of claim 2 wherein the direction of hot air discharged from the blowing outlet is at right angles to the axis of said air/gas tunnel, said blowing outlets comprising a plate having a plurality of holes and said directional plate extends over said holes at an angle toward said gas flow inlet.

4. The furnace of claim 2 wherein said blowing outlet comprises a plate having a plurality of holes and is covered with ceramic material.

5. The furnace of claim 2 wherein the structure of the blowing outlet further comprises a metal plate covered with ceramic material.

6. The furnace of claim 2 wherein said blowing outlet comprises a pair of adjacent plates, one disposed near to said suctioning inlet than the other, said plate disposed nearer to said suctioning inlet comprising a metal plate with a plurality of holes and covered with ceramic material, said other plate comprising a metal plate covered with ceramic material.

* * * * *